(12) United States Patent
Ikeda et al.

(10) Patent No.: US 8,981,769 B2
(45) Date of Patent: Mar. 17, 2015

(54) ROTATIONAL ANGLE DETECTION DEVICES

(75) Inventors: Tsutomu Ikeda, Obu (JP); Masashi Kishi, Obu (JP); Yuichi Nishida, Obu (JP); Fusatomo Miyake, Obu (JP); Tatsuhisa Matsuda, Obu (JP); Hiroki Shimoto, Obu (JP); Makoto Mase, Obu (JP)

(73) Assignee: Aisan Kogyo Kabushiki Kaisha, Aichi-Ken (JP)

( * ) Notice: Subject to any disclaimer, the term of this patent is extended or adjusted under 35 U.S.C. 154(b) by 175 days.

(21) Appl. No.: 13/616,190

(22) Filed: Sep. 14, 2012

(65) Prior Publication Data

US 2013/0063137 A1 Mar. 14, 2013

(30) Foreign Application Priority Data

Sep. 14, 2011 (JP) ................. 2011-200682
Sep. 14, 2011 (JP) ................. 2011-200686

(51) Int. Cl.
*G01B 7/30* (2006.01)
*G01D 5/14* (2006.01)
*G01D 11/24* (2006.01)

(52) U.S. Cl.
CPC ........ *G01B 7/30* (2013.01); *G01D 5/145* (2013.01); *G01D 11/245* (2013.01)
USPC .................................................. 324/207.25

(58) Field of Classification Search
USPC .................................................. 324/207.25
See application file for complete search history.

(56) References Cited

U.S. PATENT DOCUMENTS

| 7,800,358 B2 * | 9/2010 | Akiyama et al. ......... 324/207.25 |
| 2001/0003421 A1 | 6/2001 | Kubota et al. |

FOREIGN PATENT DOCUMENTS

| CN | 102072697 A | 5/2011 |
| EP | 1106973 A1 | 6/2001 |
| JP | 7320903 A | 12/1995 |
| JP | 2001165608 A | 6/2001 |
| JP | 2001-289610 | 10/2001 |
| JP | 2004-004114 | 1/2004 |
| JP | 2006-324043 | 11/2006 |

OTHER PUBLICATIONS

Japanese Office Action mailed Nov. 25, 2014, corresponding to Japanese Patent Application 2011-200682.
Japanese Office Action mailed Nov. 25, 2014, corresponding to Japanese Patent Application 2011-200686.
Chinese Office Action issued Nov. 25, 2014, corresponding to Chinese Patent Application 201210334838.5.

* cited by examiner

*Primary Examiner* — Bot Ledynh
(74) *Attorney, Agent, or Firm* — Ladas & Parry LLP

(57) ABSTRACT

A rotational angle detection device may include a sensor wiring member and a motor wiring member. Each of the sensor wiring member and the motor wiring member includes a terminal body section and a connector section that are formed separately from each other and are electrically connected to each other via a connection structure.

16 Claims, 13 Drawing Sheets ially or in conjunction with other features and teachings to provide improved rotational angle detection devices and throttle valve devices having such rotational angle detection devices. Representative

ROTATIONAL ANGLE DETECTION DEVICES

This application claims priorities to Japanese patent application serial numbers 2011-200682 and 2011-200686, the contents of which are incorporated herein by reference.

BACKGROUND OF THE INVENTION

1. Field of the Invention

Embodiments of the present invention relate to rotational angle detection devices that may be assembled with a throttle valve device for detecting an open angle of a throttle valve.

2. Description of the Related Art

A throttle valve device for controlling flow of air supplied to an automobile engine has been known. The throttle valve device may include a butterfly-type throttle valve that is controlled with respect to its rotation. The butterfly-type throttle valve has a rotational shaft that is rotated according to the operation of an accelerator of the automobile, so that an open angle of the throttle valve is changed to control the flow rate of air supplied to the engine. For this reason, a rotational angle detection device has been assembled with the throttle valve device for detecting the open angle of the throttle valve. The rotational angle detection device may detect the open angle of the throttle valve through detection of a magnetic field that may change according to rotation of the rotational shaft. With the rotational angle detection device, the throttle valve device can control the flow rate of air supplied to the engine while the rotational angle detection device detects the open angle. This type of rotational angle detection device is disclosed, for example, in JP-A-2001-289610.

The information regarding the rotational angle of the rotational shaft of the throttle valve detected by the rotational angle detection device may be transmitted to an external computer. Therefore, the rotational angle detection device may include a sensor terminal member (i.e., a sensor wiring member) for transmitting the rotational angle information to the computer. For example, the sensor terminal member may include four terminals including those for supplying an electric power to the rotational angle detection device, which is necessary for detecting the rotational angle information, and those for transmitting the detected rotational angle information to the computer.

In order to downsize the throttle valve device, some of components of the throttle valve device have been assembled with the rotational angle detection device. For example, a motor terminal member (i.e., a motor wiring member) may be assembled with the rotational angle device in addition to the sensor terminal member. The motor terminal member may include two terminals for connection with a positive side and a negative side of a power source in order to supply an electric power to a drive motor that rotatably drives the throttle valve.

There has been a need in the art for a rotational angle detection device that can be manufactured at a lower cost.

SUMMARY OF THE INVENTION

In one aspect according to the present teachings, a rotational angle detection device may include a sensor wiring member and a motor wiring member. Each of the sensor wiring member and the motor wiring member includes a terminal body section and a connector section that are formed separately from each other and are electrically connected to each other via a connection structure.

DETAILED DESCRIPTION OF THE INVENTION

Figure 1:
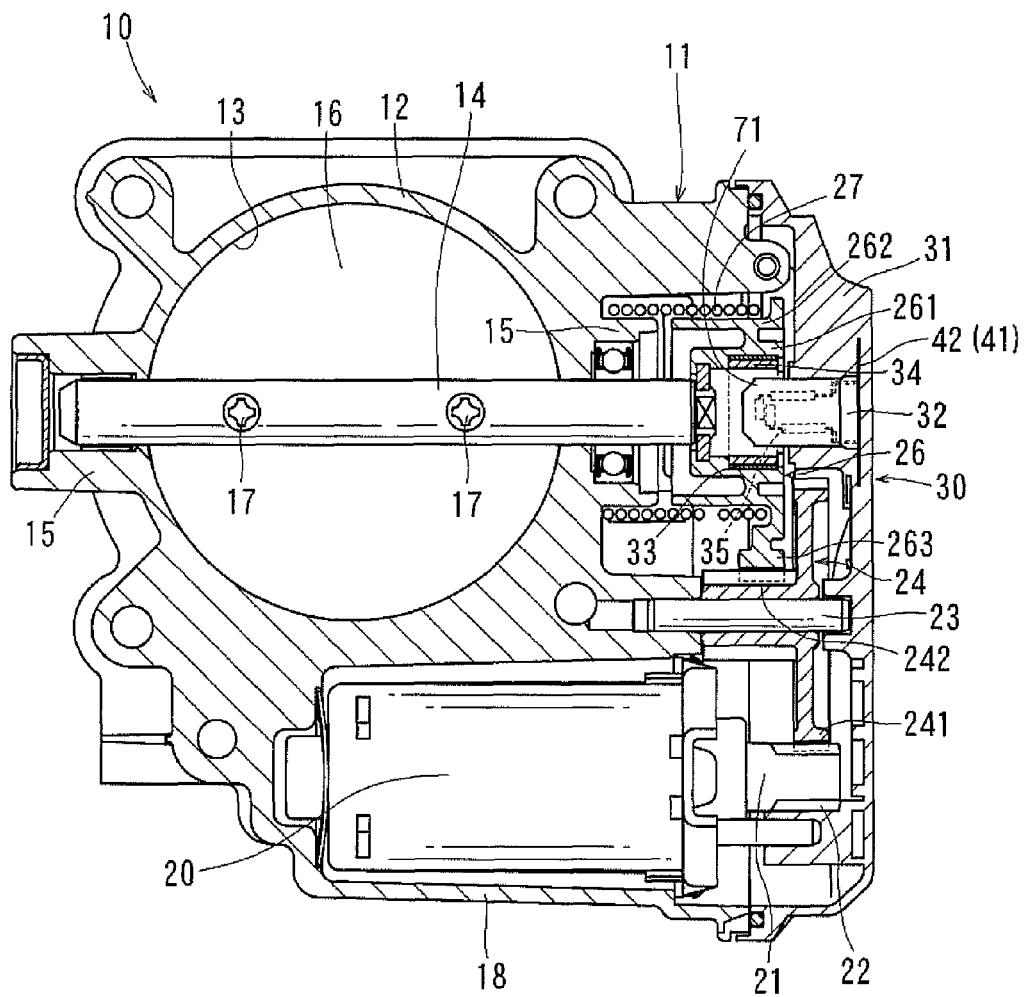
FIG. 1 is a vertical sectional view showing an internal structure of a throttle valve device incorporating a rotational angle detection device according to a representative embodiment.

Each of the additional features and teachings disclosed above and below may be utilized separately or in conjunction with other features and teachings to provide improved rotational angle detection devices and throttle valve devices having such rotational angle detection devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one example, a rotational angle detection device may be used for a throttle valve device including a throttle valve and a motor for rotating the throttle valve. The rotational angle detection device may include a magnetic detection element configured to magnetically detect a rotational angle of the throttle valve, a sensor wiring member connected to the magnetic detection element and configured to transmit a detection signal outputted from the magnetic detection element, and a motor wiring member connected to the motor, so that an electric power is supplied to the motor via the motor wiring member. Each of the sensor wiring member and the motor wiring member may include a terminal body section and a connector section formed separately from each other. The terminal body section and the connector section of the sensor wiring member are configured to be connected to the magnetic detection element and an external connector, respectively, and the terminal body section and the connector section of the motor wiring member are configured to be connected to the motor and an external connector, respectively. The terminal body section and the connector section of the sensor wiring member may be electrically connected to each other via a first connection structure. The terminal body section and the connector section of the sensor wiring member of the motor wiring member may be electrically connected to each other via a second connection structure.

With this arrangement, in order to form the terminal body section for connection with the magnetic detection element or the motor and to form the connector section for connection with the external connector, these sections can be prepared as separate sections separated from each other. After forming these sections, they may be electrically connected via the corresponding connection structure. Therefore, for example, the terminal body sections of the sensor wiring member and the motor wiring member may be formed of a same material, and their connector sections may be formed of a same material that may be different from that of the terminal body sections. Therefore, the material and the forming method of the terminal body sections and the material and the forming method of the connector sections can be suitably chosen in light of the difference in type of necessary wiring and for enabling these sections to be selectively partially treated. Hence, the necessary steps for manufacturing the rotational angle detection device can be reduced, and the rotational angle detection device can be manufactured at a lower cost.

The thickness of the terminal body section and the thickness of the connector section of each of the sensor wiring member and the motor wiring member may be different from each other. With this arrangement, the thickness of the terminal body sections and the thickness of the connector sections may be suitably determined according to the structure to which these sections are mounted or assembled. For example, in the case that the terminal body sections are embedded into a component of the throttle valve device, the thickness of the terminal body sections may be set to be smaller than the thickness of the connector sections. Therefore, it is possible to increase the freedom in design.

The material of the terminal body section and the material of the connector section of each of the sensor wiring member and the motor wiring member may be different from each other. Therefore, the material of the terminal body sections and the material of the connector sections may be suitably determined according to the structure to which these sections are mounted or assembled. Hence, it is possible to increase the freedom in design. As a result, it is possible to improve the productivity of the rotational angle detection device and to reduce the manufacturing cost of the same.

Each of the first and second connection structures may be a crimping structure. Because the crimping structure is not necessary to use a welding technique or the like, it is possible to simplify the operation for manufacturing the rotational angle detection device.

The rotational angle detection device may further include an electrical insulation member that is molded by resin and covers the first and second connection structures, so that the first and second connection structures are arranged in series and bundled together by the electrical insulation member. Because the first and second connecting structures may be bundled by the electrical insulation member such that they are arranged in series with each other, cutting or punching operations of the terminal body sections can be performed in the state that the terminal body sections are bundled together without being scattered. In addition, the terminal body sections can be assembled to the other component in the state that the terminal body sections are bundled together. Therefore, the assembling operation can be efficiently performed.

At least one of the sensor wiring member and the motor wiring member may include a wiring portion with a turned-back portion turned back to be overlapped with the wiring portion. The turned-back portion may be formed by folding a part of the wiring portion by an angle of about 180° to be overlapped with the remaining part of the wiring portion. For example, a second stage product prepared for forming the turned-back portion may be formed by the operation of punching a workpiece that is a web-like form. The provision of a portion for forming the turned-back portion may increase the freedom in the shape of the second stage product to be punched from the workpiece. Thus, the shape of punching (or press-forming) from the workpiece can be suitably changed according to the shape of the second stage product that includes the portion prepared to be folded into the turned-back portion.

In other words, the shape of the second stage product punched from the workpiece for forming the sensor terminal member and/or the motor terminal member can be suitably changed by providing the turned-back portion. Therefore, it is possible to minimize the distance between a portion for forming the sensor terminal member and a portion for forming the motor terminal member in the second stage product and to minimize the distance between a plurality of second stage products that may be punched from the same workpiece. Hence, it is possible to minimize the amount of use of the material of the workpiece. The manufacturing cost can be reduced also in this respect.

The wiring portion having the turned-back portion may extend in a direction substantially perpendicular to an extending direction of the at least one of the sensor wiring member and the motor wiring member. With this arrangement, a folding line for forming the turned-back portion may be set to extend substantially parallel to the extending direction or the wiring direction of the sensor wiring member and/or the motor wiring member. Therefore, the turned-back portion can be accurately formed by the folding operation.

The sensor wiring member may include the wiring portion with the turned-back portion. By suitably setting the position of the turned-back portion, it is possible to minimize the distance between wiring portions of the sensor wiring member. Therefore, for example, it is possible to cope with such a design having two magnetic detection elements with connection terminal sections spaced from each other by a small distance. Hence, it is possible to downsize the rotational angle detection device.

The motor wiring member may include the wiring portion with the turned-back portion. Therefore, it is not necessary to form motor connectors separately from the terminal body section. Thus, the terminal body section and the motor connectors can be formed at one time as a one-piece member. Hence, it is possible to reduce the assembling steps necessary for manufacturing the rotational angle detection device. Further, by appropriately setting the positions of the motor connectors, it is possible to reduce the unusable portion of the workpiece, which may not be used for forming the motor wiring member including the motor connectors. In particular, it is possible to effectively use the remaining portion of the workpiece, which is not used for forming the motor wiring member, as a portion for forming the motor connectors. Therefore, it is possible to form the motor connectors from the workpiece together with the terminal body section of the motor wiring member, while it is possible to reduce the amount of use of the workpiece.

The turned-back portion may include a substantially ring-shaped part. Therefore, a potential stress that may be applied to the turned-back portion may not be concentrated but may be dispersed along the direction of the ring shape. Therefore, it is possible to prevent potential breakage of the turned-back portion, which may be caused due to concentration of a stress.

In another example, a rotational angle detection device may include a magnetic detection element configured to magnetically detect a rotational angle of the throttle valve, a sensor wiring member connected to the magnetic detection element and configured to transmit a detection signal outputted from the magnetic detection element, and a motor wiring member connected to the motor, so that an electric power is supplied to the motor via the motor wiring member. At least one of the sensor wiring member and the motor wiring member may include a wiring portion with a turned-back portion turned back to be overlapped with the wiring portion.

A representative embodiment will now be described with reference to the drawings. Referring to FIG. 1, there is shown a throttle valve device 10 in a vertical sectional view. For the purpose of explanation, upward, downward, forward, rearward, leftward and rightward directions of the throttle valve device 10 will be determined based on the position of the throttle valve device 10 shown in FIG. 1.

The throttle valve device 10 may be designed for mounting to a vehicle, such as an automobile. The throttle valve device 10 may be electronically controlled for opening and closing. The throttle valve device 10 includes a throttle body 11 that may be a resin mold product. The throttle body 11 includes a bore wall 12 having a substantially cylindrical tubular shape. A bore 13 serving as an intake air passage is defined in the bore wall 12. A throttle shaft 14 may be mounted to the bore wall 12 so as to extend across the bore 13 in a diametrical direction (the left and right direction in FIG. 1). The throttle shaft 14 may be made of metal. Opposite end portions of the throttle shaft 14 may be rotatably supported by bearing portions 15 formed on the bore wall 12. A throttle valve 16 may be fixedly mounted to the throttle shaft 14 by using screws 17. The throttle valve 16 may have a disk shape, and therefore, it is configured as a butterfly-type valve. The throttle valve 16 may rotate together with the throttle shaft 14. Thus, as the throttle shaft 14 rotates, the throttle valve 16 may open and close the bore 13 according to the rotational angle of the throttle shaft 14. In this way, the throttle shaft 14 serves as a rotational shaft of the throttle valve 16.

A throttle gear 26 may be coaxially fixedly mounted to a drive-side end portion (right end portion as viewed in FIG. 1) of the throttle shaft 14. The throttle gear 26 may be a resin mold product and may include an inner tubular portion 261 and an outer tubular portion 262, so that the inner and outer tubular portions 261 and 262 constitute a double cylindrical tubular structure. A sector gear portion 263 may be formed on the outer circumference of the outer tubular portion 262. A back spring 27 may be a torsion coil spring interposed between the throttle gear 26 and a part of the throttle body 11, so that the back spring 27 normally biases the throttle valve 16 toward a fully closed position via the throttle gear 26. In other words, the back spring 27 biases the throttle shaft 14 toward the fully closed position of the throttle valve 16.

A motor receiving portion 18 for receiving a drive motor 20 may be formed on the bore wall 12 of the throttle body 11 at a position lower than the throttle shaft 14. The drive motor 20 may be a DC motor. The drive motor 20 has a drive spindle (an output shaft) 21 protruding from the drive motor 20 on the same side as the drive-side end portion (right end portion as viewed in FIG. 1) of the throttle shaft 14. A pinion gear 22 may be formed on the outer circumference of the drive spindle 21. An engine control unit (not shown) may output a control signal to the drive motor 20, so that the drive motor 20 rotates under the control of the engine control unit. The drive spindle 21 may extend parallel to the throttle shaft 14.

A countershaft 23 may be mounted to a portion of the throttle body 11 at a position adjacent to the drive spindle 21 of the drive motor 20. The countershaft 23 rotatably supports a counter gear 24 and may extend parallel to the throttle shaft 14 and the drive spindle 21. The counter gear 24 may include a large gear portion 241 and a small gear portion 242 that may be formed integrally with each other. The large gear portion 241 may engage the pinion gear 22. The small gear portion 242 has a diameter smaller than that of the large gear portion 241 and may engage the sector gear portion 263 of the throttle gear 26. Therefore, the rotation of the drive motor 20 may be transmitted to the pinion gear 22, the counter gear 24 and the throttle gear 26 in this order to rotate the throttle shaft 14. The throttle valve 16 may open and close the bore 13 according to the rotational position of the throttle shaft 14 for controlling the flow rate of air flowing through the bore 13. The pinion gear 22, the counter gear 24 and the throttle gear 26 may form a reduction gear train.

Figure 2:
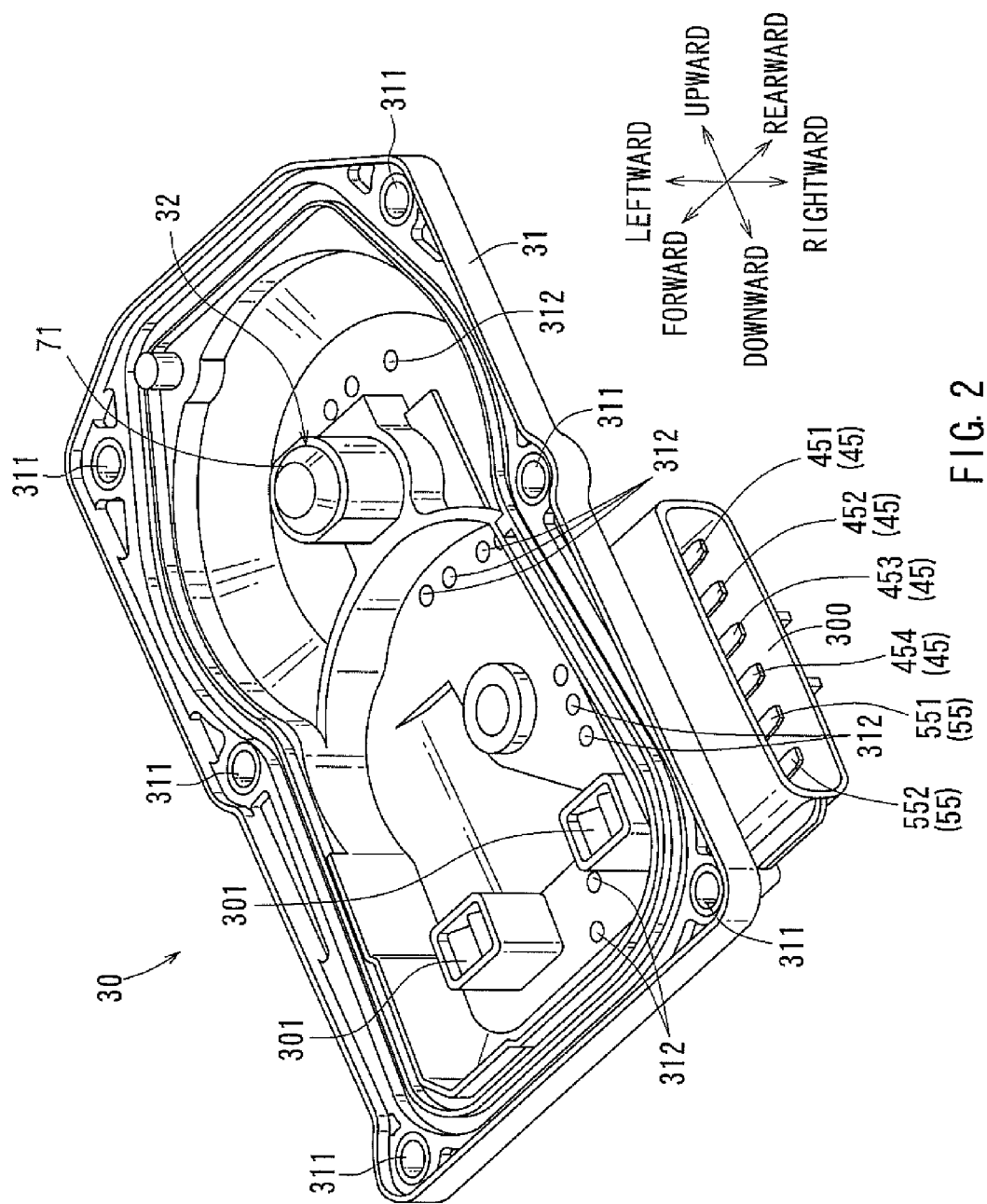
FIG. 2 is a perspective view of a sensor cover of the throttle valve device showing an inner side of the sensor cover.
Figure 3:
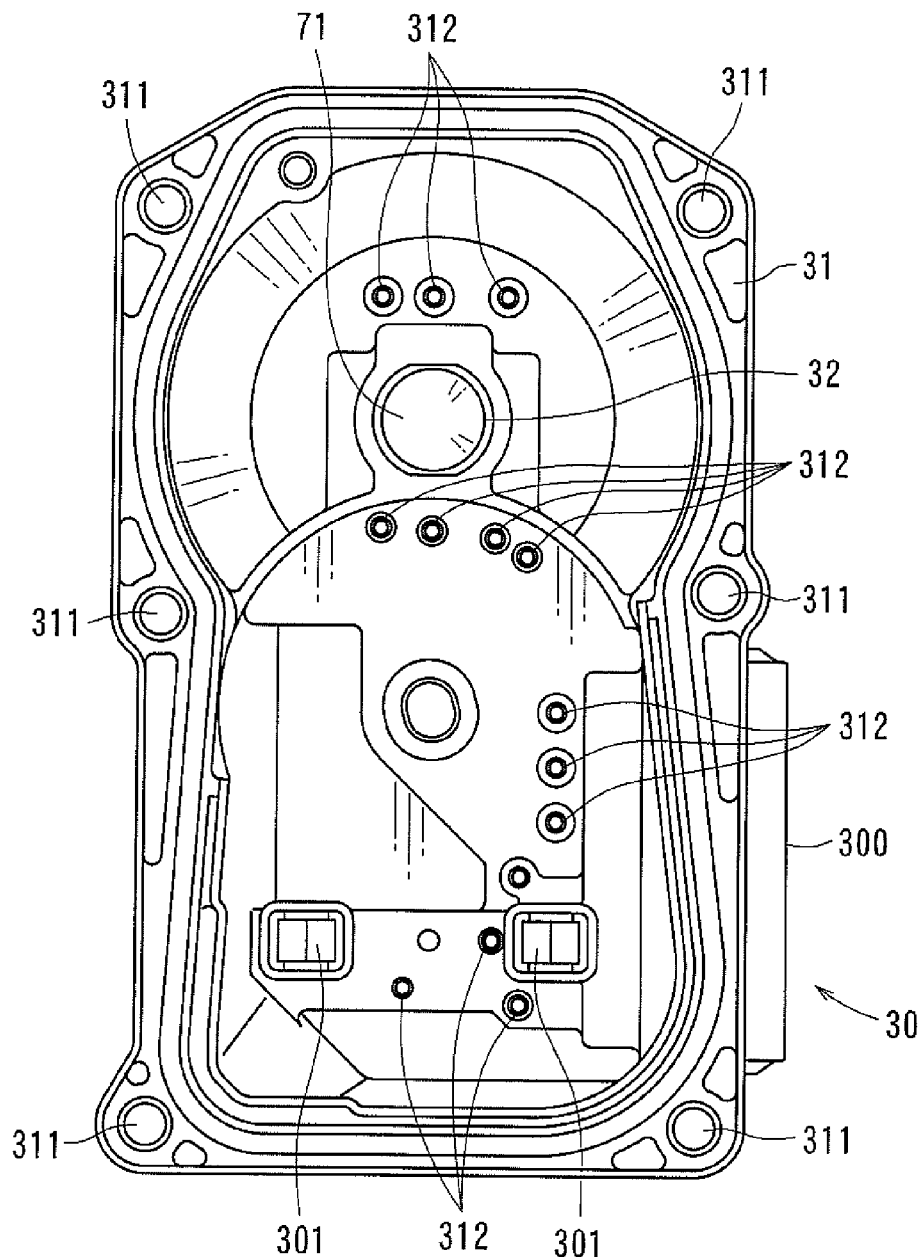
FIG. 3 is a left side view showing the inner side of the sensor cover.

As shown in FIG. 1, a sensor cover 30 is mounted to the throttle body 11 in such a manner that it covers the pinion gear 22, the counter gear 24, the throttle gear 26, etc. FIG. 2 is a perspective view showing an inner side of the sensor cover 30. FIG. 3 is a view showing the inner side of the sensor cover 30. The sensor cover 30 may be a resin mold product. A rotational angle detection device 32 may be embedded within a cover body 31 of the sensor cover 30 so as to be integrated therewith by using an insert molding technique. In this way, the cover body 31 of the sensor cover 30 serves to cover the opening of the throttle body 11 and also serves to hold electric components including the rotational angle detection device 32 through integration by an insertion molding process. Screw insertion holes 311 may be formed in the cover body 31 for insertion of screws, so that the sensor cover 30 may be mounted to the throttle body 11 by using the screws. Positioning portions 312 may be projections formed on the cover body 31 for fitting into corresponding positioning holes 61 and 65 formed in a terminal assembly 40 that will be explained later. The cover body 31 may be formed with a connector 300. A sensor connector device 45 and a motor connector device 55 may be located within the connector 300. The sensor connector device 45 and the motor connector device 55 are components of the rotational angle detection device 32 as will be described later. The sensor connector device 45 may include four sensor connectors 451, 452, 453, 454. The motor connector device 55 may include two motor connectors 551 and 552. The sensor connector device 45 and the motor connector device 55 may be exposed to the outside for connection with an external connector (not shown). Motor connectors 301 may be located within the cover body 31 (more specifically, within tubular portions formed on the cover body 31). Also, the motor connectors 301 are components of the rotational angle detection device 32 as will be explained later. The motor connectors 301 may be electrically connected to the drive motor 20.

Figure 4:
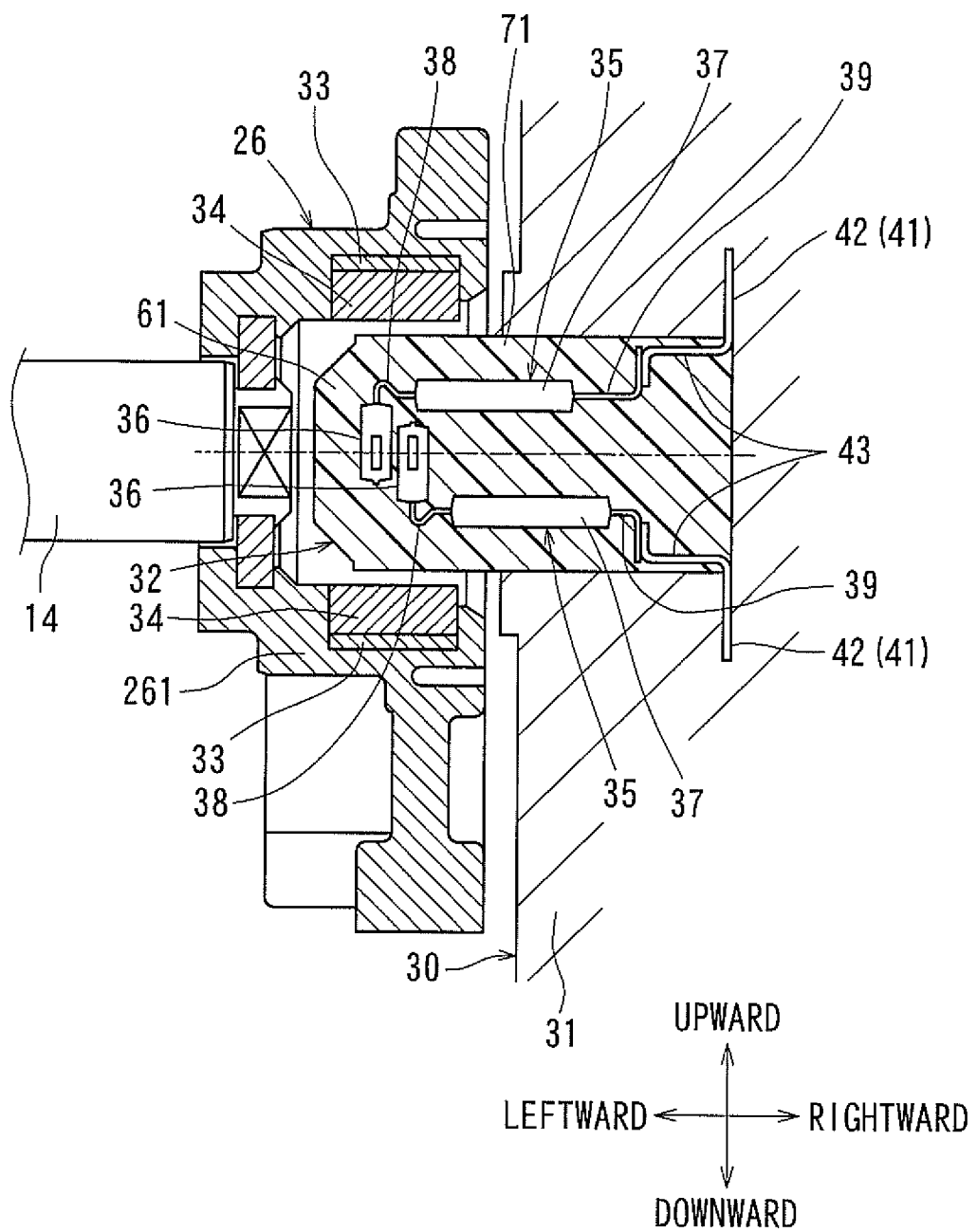
FIG. 4 is a vertical sectional view of a part of the rotational angle detection device embedded into the sensor cover.

FIG. 4 shows a vertical sectional view of a part of the rotational angle detection device 32 embedded into the sensor cover 30. More specifically, the rotational angle detection device 32 is integrated with the sensor cover 30 by an insertion molding process. Thus, the sensor cover 30 may be molded by resin while the rotational angle detection device 32 is inserted into a mold that molds the sensor cover 30. The rotational angle detection device 32 serves as a throttle position sensor for detecting the open angle of the throttle valve 16 through detection of the rotational angle of the throttle shaft 14. As shown in FIG. 4, a cylindrical tubular yoke 33 may be embedded into the inner tubular portion 261 of the throttle gear 26. The yoke 33 may be made from magnetic material and may have a pair of permanent magnets 34 that are integrally fixed to the inner circumference of the yoke 33. The permanent magnets 34 may be ferrite magnets. The permanent magnets 34 may be parallel magnetized and arranged to produce parallel magnetic fields between the permanent magnets 34.

Figure 5:
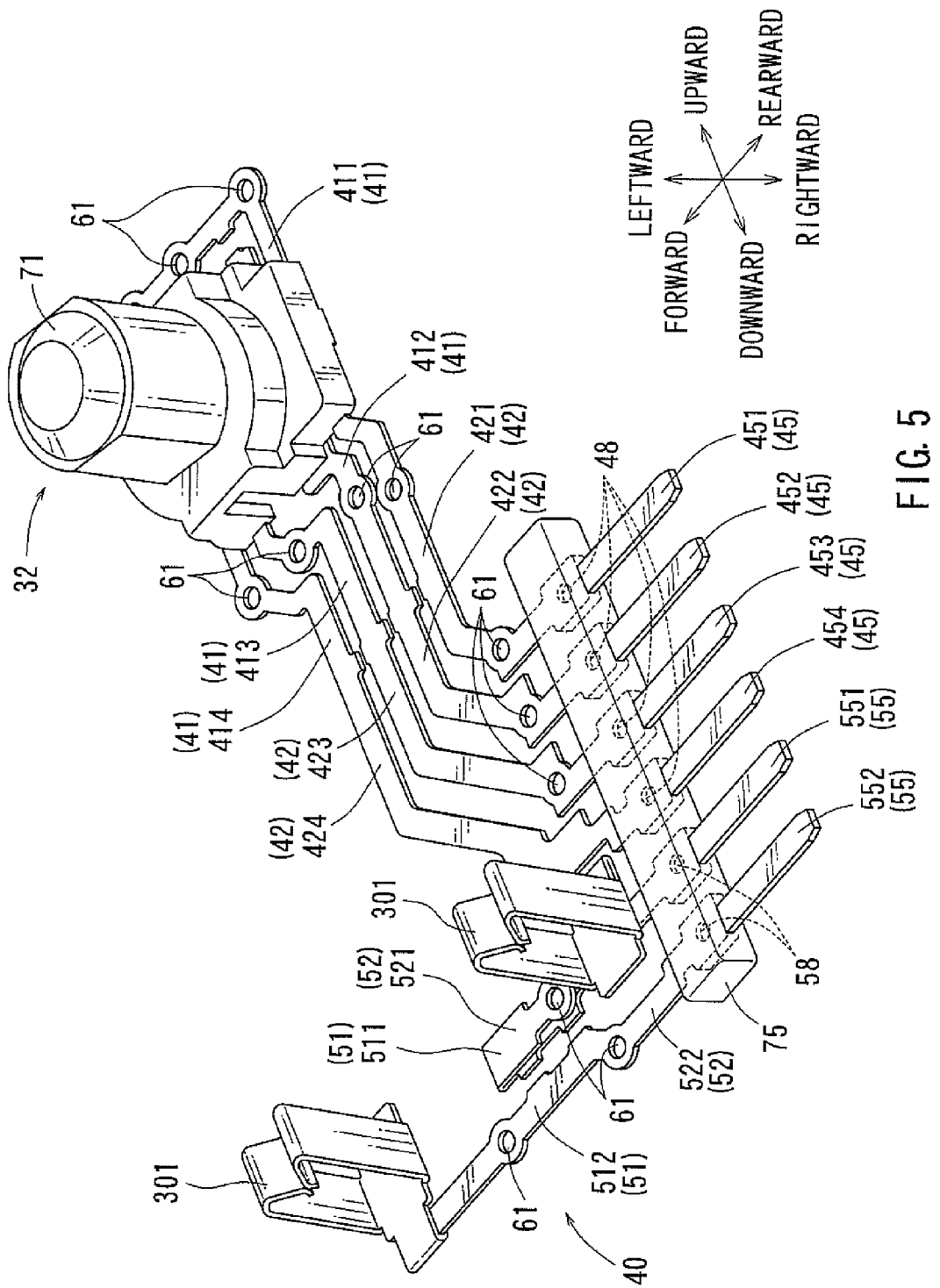
FIG. 5 is a perspective view of the rotational angle detection device.
Figure 6:
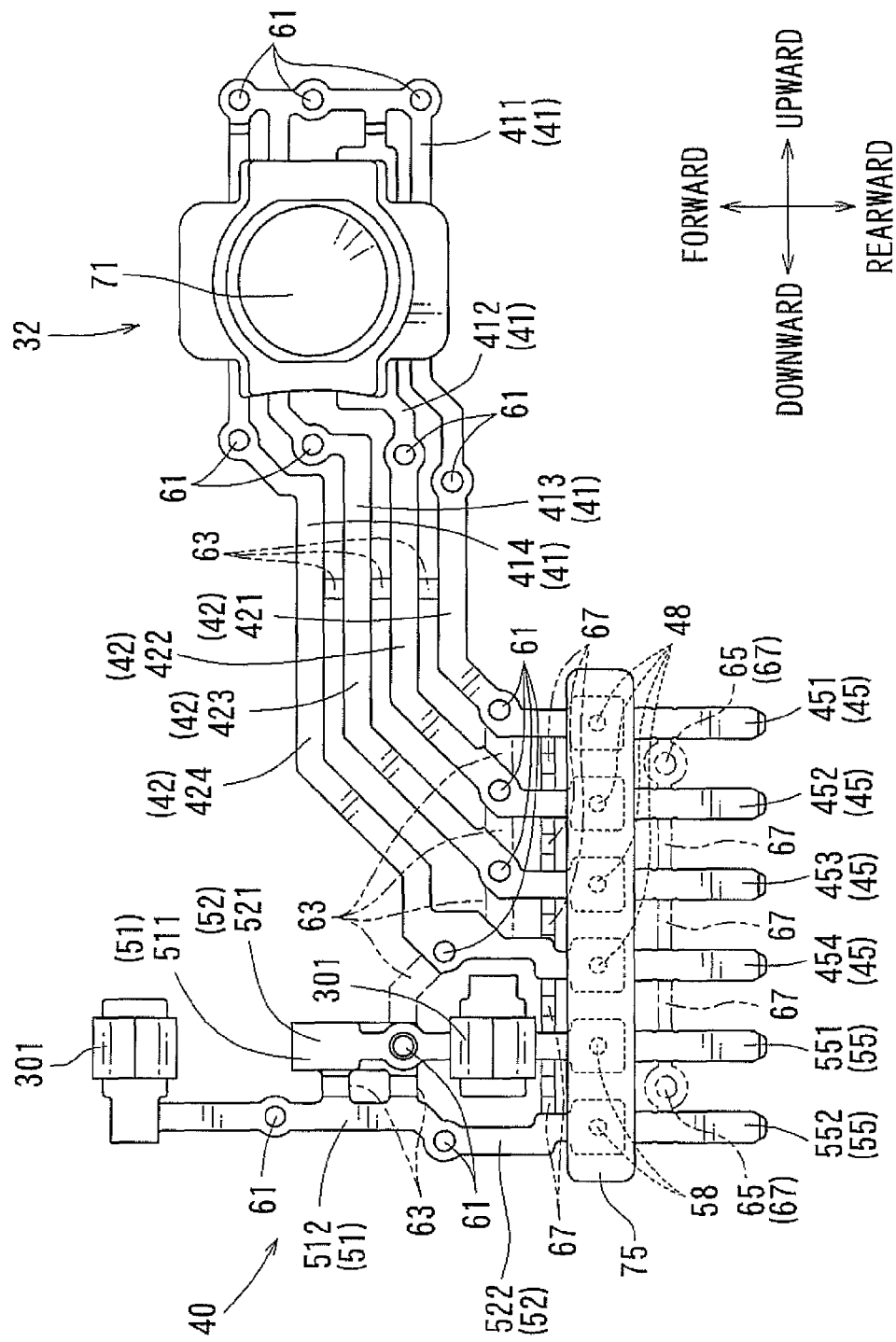
FIG. 6 is a side view of the rotational angle detection device.

The rotational angle detection device 32 will now be described in detail. FIGS. 5 and 6 show the rotational angle detection device 32 in a perspective view and a side view, respectively. Referring to FIGS. 5 and 6, in order to detect the open angle of the throttle valve 16, the rotational angle detection device 32 is provided with two magnetic detection elements 35 shown in FIG. 4. Each of the magnetic detection elements 35 can magnetically detect the rotational position of the throttle shaft 14. In addition to the magnetic detection elements 35, the rotational angle detection device 32 may include the terminal device 40, a first foam molded member 71 and a second foam molded member 75. In this embodiment, two magnetic detection elements 35 are provided for the purpose of a fail safe. Thus, in the event that one of the magnetic detection elements 35 has failed down, the other of the magnetic detection elements 35 can ensure the rotational angle detection function. As will be explained in detail, the terminal device 40 includes a sensor terminal member 41 and a motor terminal member 51. The sensor terminal member 41 may include four terminals, and the motor terminal member 51 may include two terminals. The sensor terminal member 41 serves as a sensor wiring member connected to the magnetic detection elements 35 for transmitting detection signals that are outputted from the magnetic detection elements 35. The motor terminal member 51 serves as a motor wiring member for supplying an electric power to the drive motor 20 that rotatably drives the throttle shaft 14.

Referring to FIG. 4, each of the magnetic detection elements 35 may include a sensor IC that is provided with a magnetoresistive element. More specifically, each of the magnetic detection elements 35 may include a sensing section 36, a signal arithmetic section 37, and a connection terminal section 39. The sensing section 36 may include a rectangular block-shaped casing and may have the magnetoresistive element disposed therein, so that the sensing section 36 can detect a change in the magnetic fields formed around the sensing section 36. The change in the magnetic fields detected by the sensing section 36 may be outputted from the sensing section 36 as a detection signal that is transmitted to the signal arithmetic section 37. The signal arithmetic section 37 also may be have a rectangular block-shaped casing and may include a semiconductor integrated circuit disposed therein, so that the signal arithmetic section 37 may process the detection signal inputted from the sensing section 36 in accordance with the direction of the magnetic flux and may output a linear rotational angle signal (voltage signal) that corresponds to the rotational angle. The rotational angle signal may be transmitted from the signal arithmetic section 37 to the sensor terminal member 41 via the connection terminal section 39 that is connected to the sensor terminal member 41.

A wiring portion 38 includes wires connecting between the sensing section 36 and the signal arithmetic section 37 and is bent into a substantially L-shape. Therefore, the sensing section 36 extends in a direction substantially perpendicular to the extending direction of the signal arithmetic section 37. The size of the rectangular block-shaped casing of the sensing section 36 may be smaller than that of the signal arithmetic section 37. The connection terminal section 39 is disposed on an opposite side to the sensing section 36 with respect to the signal arithmetic section 37. The two magnetic detection elements 35 are arranged such that their sensing sections 36 extend parallel to each other. Also, the signal arithmetic sections 37 of the two magnetic detection elements 35 extend parallel to each other. The magnetoresistive elements of the sensing sections 36 are positioned on the rotational axis of the throttle shaft 14 to detect the change of direction of the magnetic flux within the magnetic fields as the throttle gear 26 rotates about the throttle shaft 14.

Figure 7:
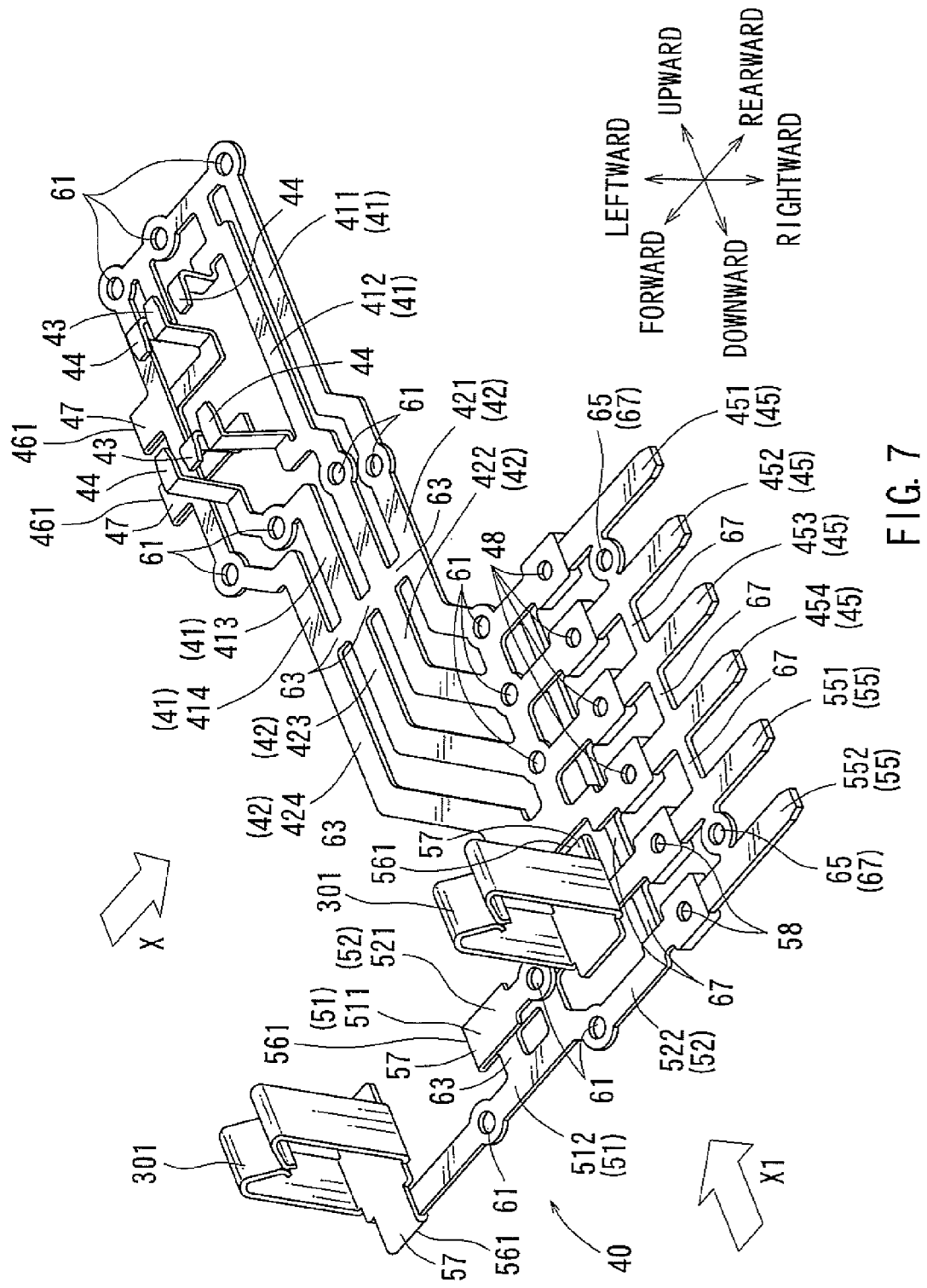
FIG. 7 is an enlarged perspective view of a terminal member of the rotational angle detection device.

The sensor terminal member 41 for transmitting the detection signals from the magnetic detection elements 35 and the motor terminal member 51 for supplying an electric power to the drive motor 20 will now be described. As shown in FIGS. 5 to 7, the four terminals of the sensor terminal member 41 may be a sensor terminal 411 for supplying an electric source, a sensor terminal 412 for outputting a first detection signal, a sensor terminal 413 for outputting a second detection signal, and a sensor terminal 414 for connection to the ground. The two terminals of the motor terminal member 51 may be a positive side motor terminal 511 and a negative side motor terminal 512. The four sensor terminals 411, 412, 413 and 414 may be formed at one time together with the two motor terminals 511 and 512 as will be explained later.

Figure 8:
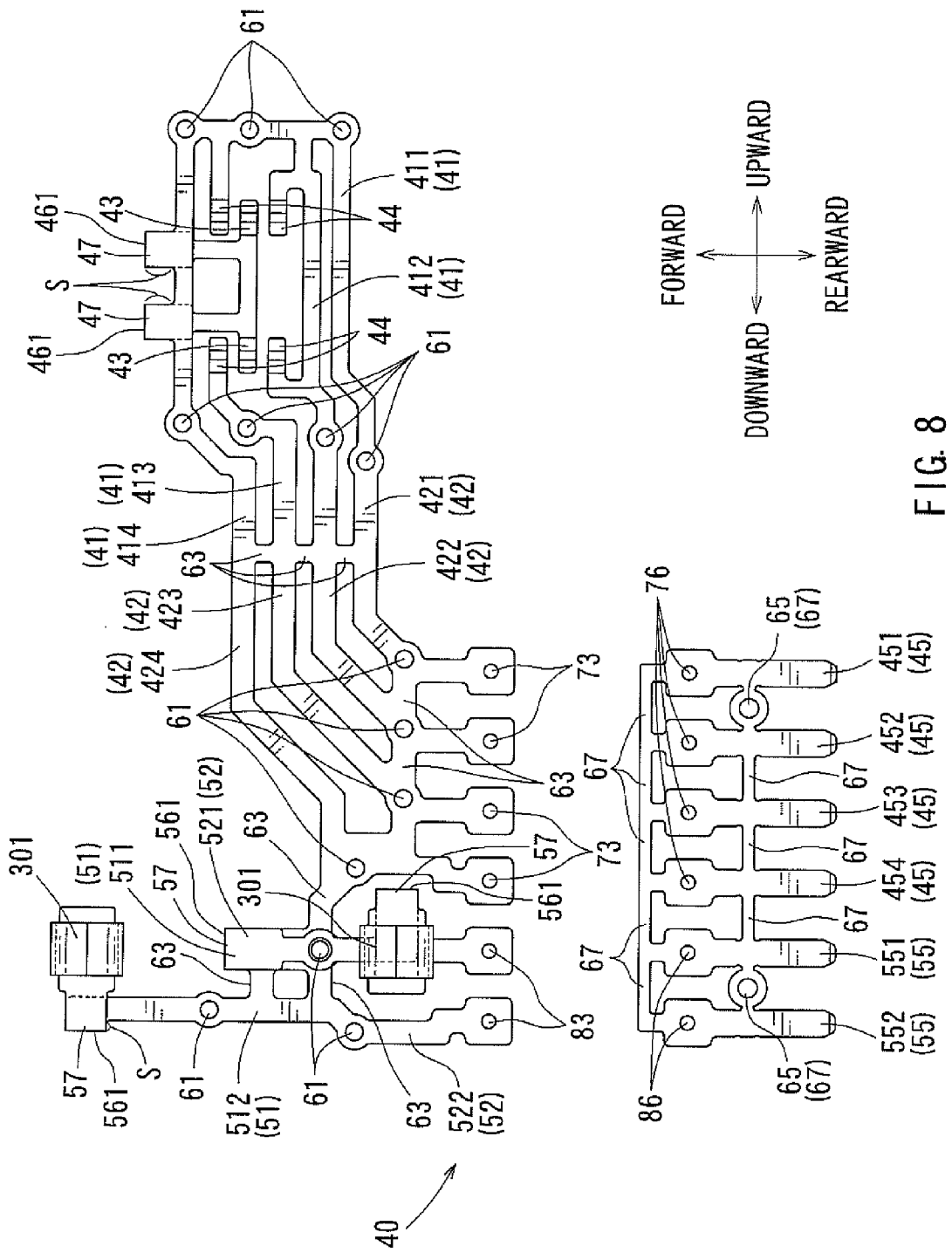
FIG. 8 is a side view showing the state before connection to form the terminal member.

The terminal device 40 is shown in an enlarged perspective view in FIG. 7. FIG. 8 is a side view of parts of the terminal device 40 before the parts are assembled into the terminal device 40. The terminal device 40 is a part of the rotational angle detection device 32 that includes the magnetic detection elements 35, the first foam molded member 71 and the second foam molded member 75 in addition to the terminal device 40. In the state shown in FIG. 8, the sensor terminal member 41 is separated into a terminal body section 42 for connection with the magnetic detection elements 35 and a connector section 45 for connection with an external connector (not shown). Similarly, the motor terminal member 51 is separated into a terminal body section 52 for connection with the drive motor 20 and a connector section 55 for connection with an external connector (not shown). More specifically, the sensor terminal 411 is separated into a terminal body 421 and a connector 451, the sensor terminal 412 is separated into a terminal body 422 and a connector 452, the sensor terminal 413 is separated into a terminal body 423 and a connector 453, and the sensor terminal 414 is separated into a terminal body 424 and a connector 454. Thus, the terminal body section 42 includes the terminal bodies 421, 422, 423 and 424, and the connector section 45 includes the connectors 451, 452, 453 and 454. The motor terminal 511 is separated into a terminal body 521 and a connector 551, and the motor terminal 512 is separated into a terminal body 522 and a connector 552. Thus, the terminal body section 52 includes the terminal bodies 521 and 522, and the connector section 55 includes the connectors 551 and 552.

The parts of the terminal device 40 may be formed by punching and bending metal plates. In this embodiment, the terminal body section 42 of the sensor terminal member 41, and the terminal body section 52 of the motor terminal member 51 are formed by punching and bending a metal plate that may have a thickness of 0.3 mm. Preferably, the metal plate may be a copper plate having a spring characteristic. The positioning holes 61 for fitting with corresponding positioning portions 312 (that are projections as described previously) may be formed in the terminal body sections 42 and 52. In the state shown in FIGS. 7 and 8, portions of the terminal body section 42 and portions of the terminal body section 52 positioned adjacent to each other may be connected to each other via connecting portions 63. Therefore, the connecting portions 63 may prevent the terminal body section 42 and the terminal body section 45 from being separated from each other. However, after the second foam molded member 75 has been molded as will be described later, the connecting portions 63 may be cut and removed as shown in FIG. 6 in a manner known as bus-bar cutting.

The connector section 45 of the sensor terminal member 41, and the connector section 55 of the motor terminal member 51 may be formed by punching and bending a metal plate that may have a thickness of 0.6 mm. Preferably, the metal plate may be a brass plate. In this way, the thickness of the connector sections 45 and 55 may be different from the thickness of the terminal body sections 42 and 52. The positioning holes 65 for fitting with corresponding positioning portions 312 (that are projections as described previously) may be formed in the connector sections 45 and 55. Portions of the connector section 45 and portions of the connector section 52 positioned adjacent to each other may be connected to each other via connecting portions 67. Therefore, the connecting portions 67 may prevent the connector section 45 and the connector section 55 from being separated from each other. However, after the second foam molded member 75 has been molded as will be described later, the connecting portions 67 may be cut and removed as shown in FIG. 6 in a manner known as bus-bar cutting. Therefore, after the molding process of the second foam molded member 75, the connector section 45 and the connector section 55 may be separated so as not to be electrically connected to each other. The connector section 45 including the connectors 451, 452, 453 and 454 of the sensor terminal member 41 may be plated with gold for improving the electric conductivity with the external connector that may be connected to the connector section 45. However, no plating is made to the connector section 55 including the connectors 551 and 552 of the motor terminal member 51.

Figure 9:
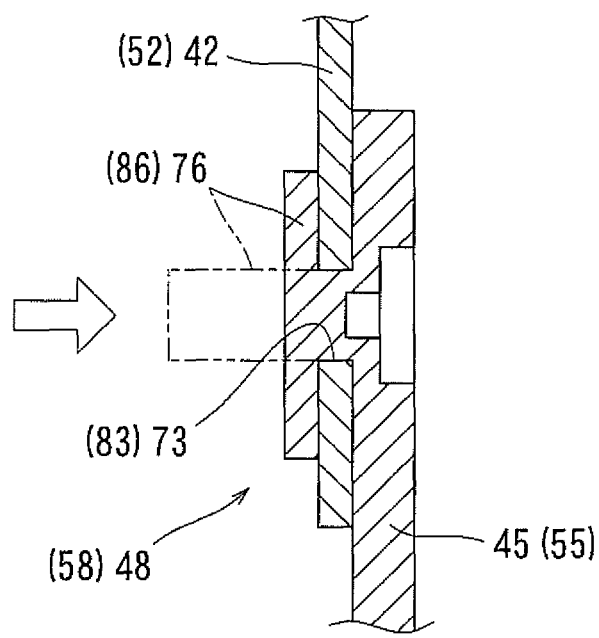
FIG. 9 is an enlarged sectional view showing one of connecting structures of the terminal member.

FIG. 9 shows an enlarged sectional view of one of connecting structures 48(58) between the terminal body section 42(52) and the connector section 45(55). As shown in FIG. 9, the terminal body section 42(52) and the connector section 45(55) are mechanically and electrically connected to each other via the connecting structure 48(58). The connecting structure 48(58) may be a crimping structure that is obtained by crimping the terminal body section 42(52) and the connector section 45(5) together. In this embodiment, six connecting structures including four connecting structures 48 and two connecting structures 58 are provided to correspond to the number of their terminals. More specifically, four connecting structures 48 are provided between the terminal body section 42 and the connector section 45 of the sensor terminal member 41, and two connecting structures 58 are provided between the terminal body section 52 and the connector section 55 of the motor terminal member 51. These six connecting structures may be arranged in series with each other along a straight line.

As shown in FIG. 9, the connecting structure 48 of the sensor terminal member 41 may include a hole 73 formed in the terminal body section 42 and a boss portion 76 formed on the connector section 45. The boss portion 76 may be fitted into the hole 73, and thereafter, the boss portion 76 may be crimped to form the connecting structure 48. More specifically, by the crimping operation, the boss portion 76 may be deformed such that the boss portion 76 closely contacts the inner circumferential wall of the hole 73 and a portion of the terminal body section 42 around the hole 73 is clamped between the crimped end (deformed head) of the boss portion 76 and the connector section 45. In this way, the connecting structure 48 mechanically and electrically connects the terminal body section 42 and the connector section 45 to each other. Similarly, the connecting structure 58 of the motor terminal member 51 may include a hole 83 formed in the terminal body section 52 and a boss portion 86 formed on the connector section 55. The boss portion 86 may be fitted into the hole 83, and thereafter, the boss portion 86 may be crimped to form the connecting structure 58. More specifically, by the crimping operation, the boss portion 86 may be deformed such that the boss portion 86 closely contacts the inner circumferential wall of the hole 83 and a portion of the terminal body section 52 around the hole 83 is clamped between the crimped end of the boss portion 86 and the connector section 55. In this way, the connecting structure 58 mechanically and electrically connects the terminal body section 52 and the connector section 55 to each other.

Figure 10:
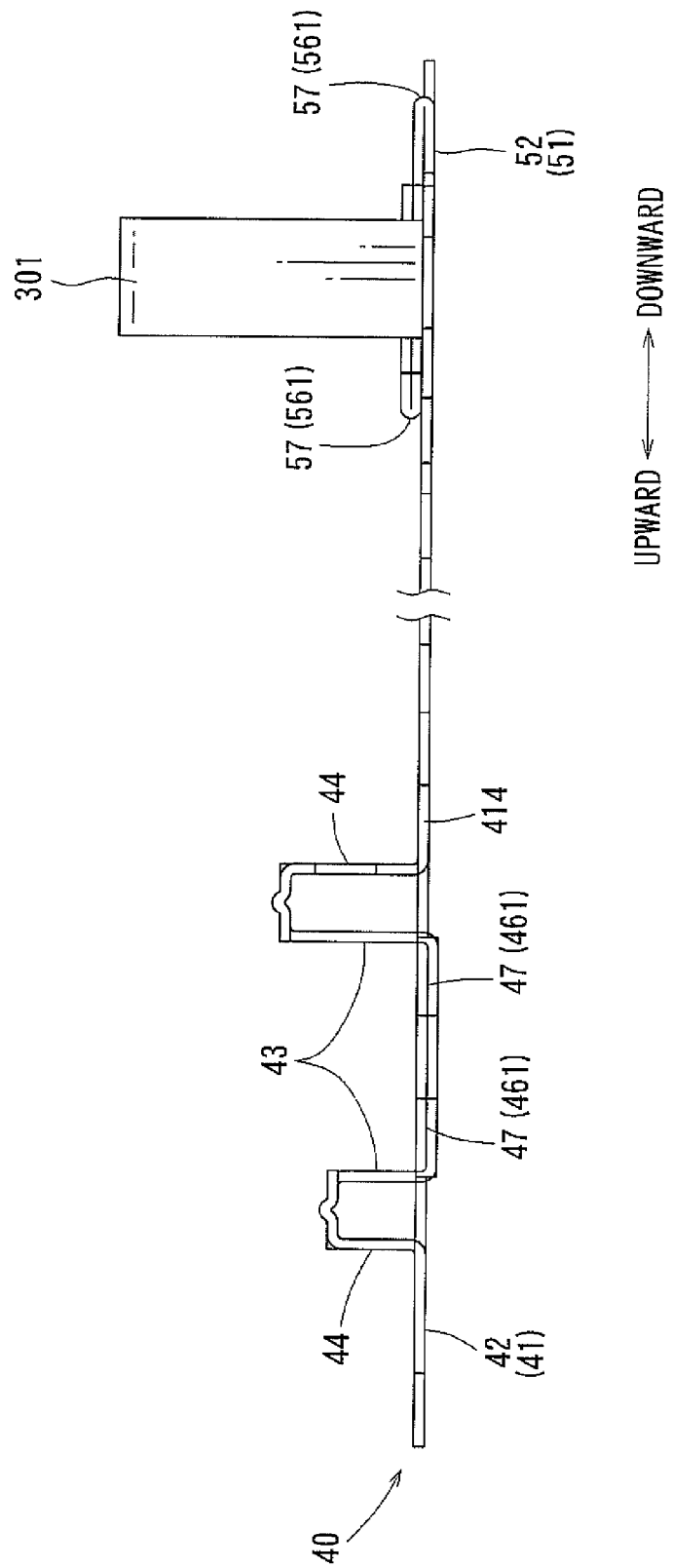
FIG. 10 is a view of the terminal member as viewed in a direction indicated by arrow X in FIG. 7.
Figure 11:
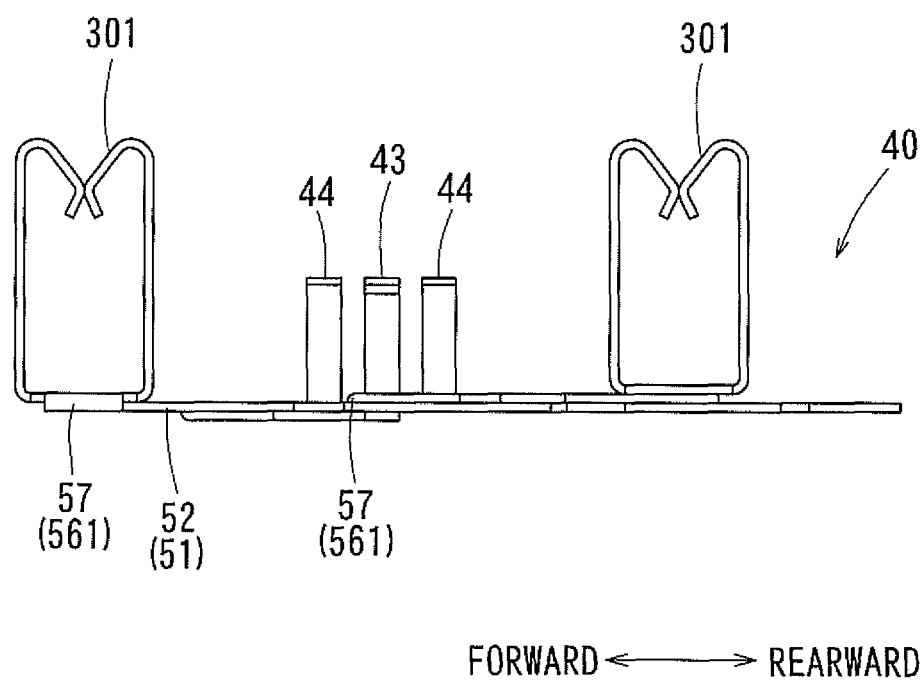
FIG. 11 is a view of the terminal member as viewed in a direction indicated by arrow X1 in FIG. 7.

FIG. 10 shows a front view of the terminal device 40 as viewed in a direction indicated by arrow P in FIG. 7. FIG. 11 shows a bottom view of the terminal device 40 as viewed in a direction indicated by arrow Q in FIG. 7. As shown in FIGS. 10 and 11, the sensor terminal member 41 includes turned-back portions 47, and the motor terminal member 61 includes turned-back portions 57.

Figure 12:
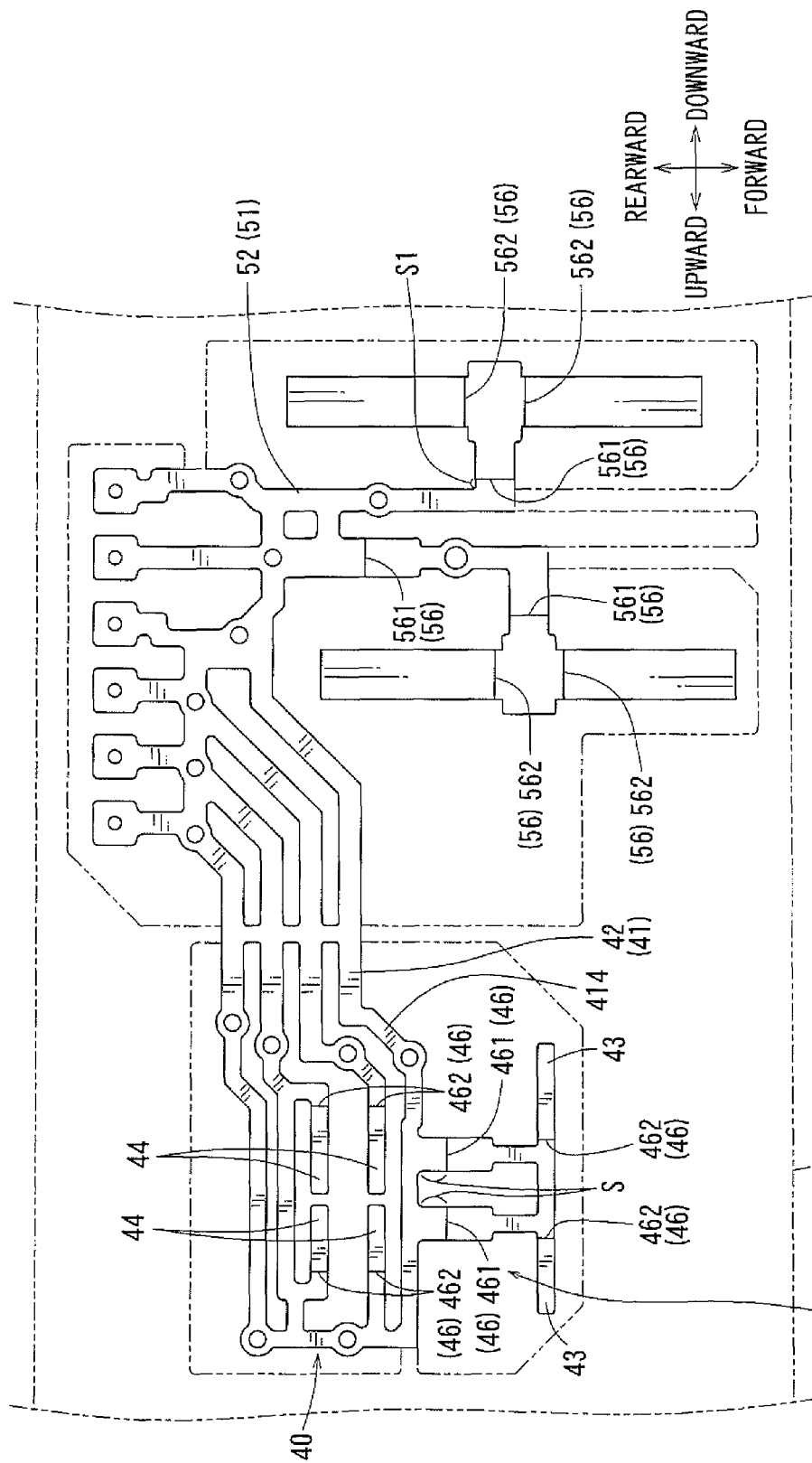
FIG. 12 is a side view of a second stage product punched from a workpiece for forming the terminal member.

As shown in FIGS. 7 and 8 to 10, two turned-back portions 47 are formed on a forwardly extending portion of the terminal body section 42 of the sensor terminal member 41. As shown in FIG. 12, the extending portion of the terminal body section 42 may include a pair of leg-like positions and an end portion whether the leg-like portions are joined to each other. The leg-like portions are folded to form the turned-back portions 47. The end portion of the extending portion is formed with earth connection terminals 43. The earth connection terminals 43 may be connected to the connection terminal sections 39 of the magnetic detection elements 35. Therefore, the extending portion having the turned-back portions 47 is in continuity with the sensor terminal 414 for connection with the ground and the turned-back portions 47 are positioned adjacent to each other. In other words, the extending portion extending from the sensor terminal 414 and bent at the turn-back portions 47 may form the connection terminals 43 that are connected with the connection terminal sections 39 of the magnetic detection elements 35, respectively. Two connection terminals 44 for outputting the detection signals may be formed in continuity with each of the sensor terminals 412 and 413.

Figure 13:
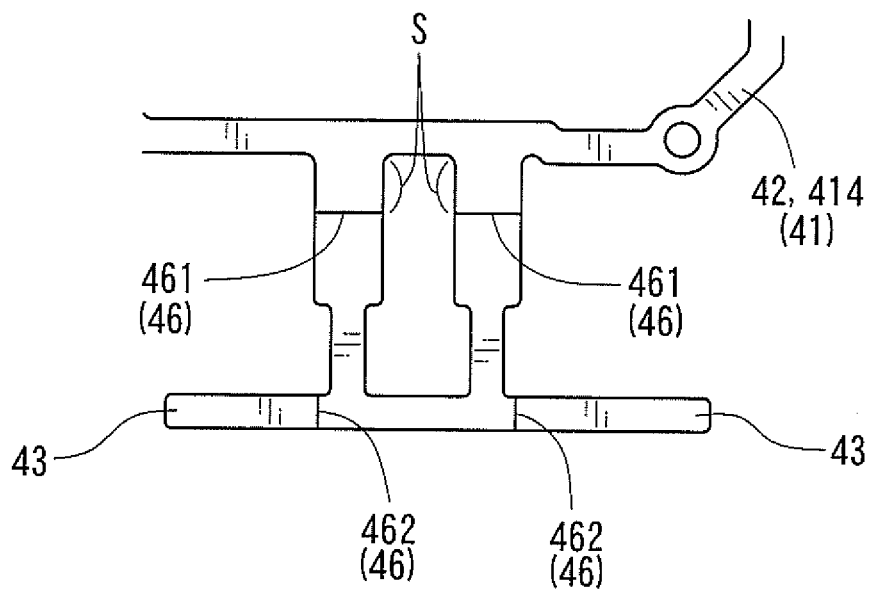
FIG. 13 is an enlarged view of a part of the second stage product including portions formed to be turned back.
Figure 14:
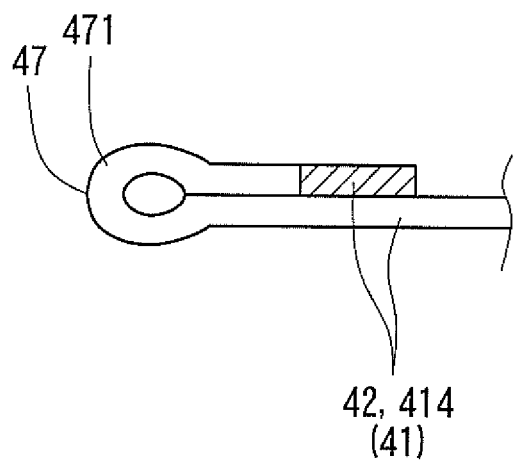
FIG. 14 is an enlarged view showing a configuration of one of turned-back portions.

FIG. 12 shows a second stage product W2 that may be punched from a hoop material W1 by using a press machine or a punching machine (not shown). The hook material W1 may be a web-like metal plate (workpiece). In FIG. 12, the second stage product W2 is still not completely separated from the hoop material W1 but is joined to the hoop material W1 at plural portions. In FIG. 12, cut lines for the second stage product W2 are indicated also by two-dot chain lines within the area of the hoop material W1. The second stage product W2 may be used for forming the terminal device 40, and therefore, the connecting terminals 43 and 44 and the motor connectors 301 that will be explained below are shown in the state before they are bent or folded. The joint portions between the hoop material W1 and the second stage product W2 may be cut at an appropriate time before the second stage product W2 is formed into the terminal device 40 shown in FIG. 8. Although not shown in FIG. 12, a plurality of second stage products W2 may be punched from the hoop material W1 at positions spaced from each other in the lengthwise direction of the hoop material W1. FIG. 13 is an enlarged view of a part of FIG. 12 including portions that are adapted to be folded into the turned-back portions 47. FIG. 14 is an enlarged view of one of the turned-back portions 47.

The turned-back portions 47 may be turned-back by an angle of about 180 degrees, so that a part of the extending portion extending from the terminal 414 may be overlapped with the other part of the extending portion. As shown in FIGS. 7, 8 and 10 to 12, the connection terminals 43 extend in the upward and downward direction. On the other hand, the extending portion having the turned-back portions 47 extends in the forward and rearward direction. Therefore, the extending direction of the connection terminals 43 is perpendicular to the extending direction of the extending portion having the turned-back portions 47.

In order to form bent or folded portions including the turned-back portions 47, folding lines 46 may be formed in the terminal body section 42. The folding lines 46 may include folding lines 461 for forming the turned-back portions 47 and folding lines 462 for forming the connection terminals 43 and 44 that may be bent in a manner like an inverted L-shape. The folding lines 461 extend substantially in parallel to the extending direction of the extending portion. In addition, the folding lines 461 are positioned to be offset forwardly from the terminal 414 by a distance S. This distance S may provide a reserve or a margin usable for folding. By providing the distance S, it may be possible to eliminate need of forming a relief cut(s) for relieving potential twisting of the terminal 414, which may be caused during the pressing operation for forming the turned-back portions 47. As shown in FIG. 14, the turned-back portion 47 may have a substantially elliptical ring-shaped part 471. In order to form the inverted L-shape of the connection terminals 44, a folding punch may be guided by a guide device disposed at a lower mold of a press mold (not shown) used for a press-folding operation of the connection terminals 44, so that the connection terminals 44 can be accurately formed into the substantially inverted L-shape by the folding punch that is guided by the guide device.

As shown in FIGS. 7, 8 and 10 to 12, turned-back portions 57 similar to the turned-back portions 47 may be formed on the terminal body section 52 of the motor terminal member 51. The turned-back portions 57 are provided in order to form the motor connectors 301. In this embodiment, three turned-back portions 57 are provided and located at suitable positions for forming the motor connectors 301. More specifically, the turned-back portions 57 are formed on two motor connector forming extensions that extend substantially parallel to each other and have end portions to be formed as the motor connectors 301. Two turned back portions 57 are formed on one of the motor connector forming extensions. One turned-back portion 57 is formed in the other of the motor connector forming extensions. When terminals (not shown) of the motor 20 are inserted into the motor connectors 301, the motor connectors 301 may resiliently deform so as to be electrically mechanically connected to the terminals.

Also, each of the turned-back portions 57 may be turned-back by an angle of about 180 degrees, so that a part of each motor connector forming extension is overlapped with the other part of the corresponding motor connector forming extension. In other words, a part of the motor terminal 511 (512) is overlapped with the other part of the terminal 511 (512). The motor connector forming extension of the terminal body section 52 having the two turned-back portions 57 is turned-back in a direction parallel to the corresponding motor connector forming extension of the terminal body section 52 and is further turned-back in a direction perpendicular to the parallel direction. The motor connector forming extension of the terminal body section 52 having one turned-back portion 57 is turned-back in a direction perpendicular to the extending direction of the motor connector forming extension.

Also, in order to form bent or folded portions including the turned-back portions 57, folding lines 56 may be formed in the motor connector forming extensions of the terminal body section 52. The folding lines 56 may include folding lines 561 for forming the turned-back portions 57 and folding lines 562 for forming the motor terminals 301 that may be bent in a manner like a substantially inverted L-shape. The folding lines 561 may extend substantially in parallel to or perpendicular to the extending direction of the motor connector forming extensions. Also, the folding line(s) 561 may be positioned to be offset from a part of the corresponding motor connector forming extension on the side of the terminal body section 52. For example, as shown in FIG. 12, the folding line 561 of the motor connector forming extension having one folding line 561 may be offset by a distance S1 from a part of the motor connector forming extension on the side of the terminal body section 52. Also, this distance S1 may provide a reserve or a margin used for folding. In addition, each of the turned-back portions 57 may have a substantially elliptical ring-shaped part that may be similar to that of the turned-back portion 47 shown in FIG. 14.

The sensor terminal member 41 formed as described above may be mounted to the magnetic detection devices 35 as shown in FIG. 4. After that, the first foam molded member 71 and the second foam molded member 75 may be molded as shown in FIGS. 5 and 6.

More specifically, the first foam molded member 71 may be molded by a foam resin (e.g., a chemical foam resin) to have a substantially cylindrical shape. The foam resin may have an electrical insulation property. The first foam molded member 71 may be molded in a state that the sensing sections 36 and the signal arithmetic sections 37 of the magnetic detection elements 35 are positioned as shown in FIG. 4 and that the connection terminal sections 39 are connected to the sensor terminal member 41, so that the sensing sections 36, the signal arithmetic sections 37 and the magnetic detection elements 35 are held in position. In this way, the magnetic detection elements 35 may be embedded within the first foam molded member 71 while they are electrically connected to the sensor terminal member 41 and are fixed in position. The first foam molded member 71 may be molded together with the cover body 31 by using an insertion molding technique. Therefore, a tip end portion of the first foam molded member 71 may protrude inwardly from the cover body 31 and a base end potion of the first foam molded member 71 may be embedded into the cover body 31.

The second foam molded member 75 may cover the connecting structures 48 between the terminal body section 42 and the connector section 45 and may also cover the connecting structures 58 between the terminal body section 52 and the connector section 55. The second foam molded member 75 may be molded in such a manner that the connecting structures 48 and 58 arranged in series with each other are integrated or bundled together. The second foam molded member 75 may be molded to have a substantially rectangular prism shape by a foam resin having an electrical insulation property. The same resin as used for molding the first foam molded member 75 may be used for molding the second foam molded member 75. As noted above, the connecting structures 48 and 58 arranged in series with each other are integrated or bundled together by the second foam molded member 75. Therefore, the sensor terminal member 41 and the motor terminal member 51 may be connected together within a plane while they are electrically insulated from each other. Hence, the four sensor terminals 411, 412, 413 and 414 of the sensor terminal member 41 and the two motor terminals 511 and 512 of the motor terminal member 51 may be held to be bundled together without being scattered.

The foam resin for forming the first foam molded member 71 and the foam resin for forming the second foam molded member 75 may be a mixture of a resin and a foaming agent. For example, the resin used for the first and second foam molded members 71 and 75 may be the same resin as used for molding the cover body 31 of the sensor cover 30. Preferably, the resin used for molding the cover body 31 may be a polybutylene terephthalate (PBT) resin from a viewpoint of ease of molding. A mixture of a resin and a foaming agent may also be used for forming the cover body 31.

The sensor cover 30 constructed as described above may be mounted to the throttle body 11 in such a manner that it covers the pinion gear 26, the counter gear 24 and the throttle gear 26, etc. as shown in FIG. 1. Then, the tip end portion of the first foam molded member 71 is located to protrude into the inner tubular portion 261 of the throttle gear 26 so as not to contact with the permanent magnets 34 and the yoke 33 of the throttle gear 26. In addition, the motor terminal member 51 of the rotational angle detection device 32 may be electrically connected to the corresponding terminals (not shown) of the driver motor 20 via the motor connectors 301.

Further, the sensor connector device 45 and the motor connector device 55 located within the connector 300 and exposed to the outside may be connected to an external connector (not shown) that is connected to an engine control unit (ECU).

With the rotational angle detection device 32 described above, the terminal body sections 42 and 52 connected the magnetic detection elements 35 and the drive motor 20 may be formed separately from the connector sections 45 and 55 connected to the external connector. After forming the terminal body sections 42 and 52 and the connector sections 45 and 55, the terminal body section 42 may be electrically and mechanically connected to the connector section 45 via the connecting structures 48, and the terminal body section 52 may be electrically and mechanically connected to the connector section 55 via the connecting structures 58. Therefore, the terminal body section 42 (serving as a sensor wiring member) and the terminal body section 52 (serving as a motor wiring member) may be formed of a same metal plate, such as a copper plate or a phosphor bronze plate having a spring characteristic. On the other hand, the connector sections 45 and 55 may be formed of a material, such as brass, that is different from the material of the terminal body sections 42 and 52. Therefore, the material and the forming method of the terminal body sections 42 and 52 and the material and the forming method of the connector sections 45 and 55 can be suitably chosen in light of the difference in type of necessary wiring and for enabling these sections to be selectively partially treated. For example, in order to plate the connector section 45 with gold, the terminal body sections 42 and 52 may be formed separately from the connector section 45. Therefore, the operation for plating the connector section 45 with gold can be efficiently performed. Hence, the necessary steps for manufacturing the rotational angle detection device 32 can be reduced, and the rotational angle detection device 32 can be manufactured at a lower cost.

Further, in the above embodiment, the thickness of the terminal body sections 42 and 52 are set to be 0.4 mm that is different from 0.6 mm of the thickness of the connector sections 45 and 55. In other words, the thickness of the terminal body sections 42 and 52 and the thickness of the connector sections 45 and 55 may be suitably determined according to the structure to which these sections are mounted or assembled. For example, in the case that the terminal body sections 42 and 52 are embedded into a component of the throttle valve device 10, the terminal body sections 42 and 52 may be set to have a thickness smaller than a thickness of the connector sections 45 and 55. Therefore, it is possible to increase the freedom in design.

Further, in the above rotational angle detection device 32, the material of the terminal body sections 42 and 52 is chosen to be a copper or a copper-based material have a spring property, while the material of the connector sections 45 and 55 are chosen to be brass. In other words, the material of the terminal body sections 42 and 52 and the material of the connector sections 45 and 55 may be suitably determined according to the structure to which these sections are mounted or assembled. Therefore, it is possible to increase the freedom in design. Hence, it is possible to improve the productivity of the rotational angle detection device 32 and to reduce the manufacturing cost of the same.

Further, the connecting structures 48 for connecting between the terminal body section 42 and the connector section 45 are configured as crimping structures. Also, the connecting structures 58 for connecting between the terminal body section 52 and the connector section 55 are configured as crimping structures. Therefore, the connecting structures 48 and 58 are not necessary to use a welding technique or the like. Hence, it is possible to simplify the operation for manufacturing the rotational angle detection device 32.

Further, the connecting structures 48 and 58 are covered by the second foam molded member 75 that is molded by a foam resin having an electrical insulation property. Therefore, it is possible to ensure electrical insulation of the connecting structures 48 and 58 from the other components. Furthermore, the connecting structures 48 and 58 are bundled by the second foam molded member 75 such that they are arranged in series with each other. Therefore, the cutting or punching operations of the terminal body sections 42 and 52 can be performed in the state that the terminal body sections 42 and 52 are bundled together without being scattered. In addition, the terminal body sections 42 and 52 can be assembled in the state that the terminal body sections 42 and 52 are bundled together. Therefore, the assembling operation can be efficiently performed.

Furthermore, with the rotational angle detection device 32, the extending portion of the sensor terminal member 41 and the extensions of the motor terminal member 51 serve as wiring members and are turned-back to form the turned-back portions 47 and 57. The second stage product W2 prepared for forming the turned-back portions 47 and 57 may be formed by the operation of punching the hoop material W1 that is a web-like form. The provision of the extending portion or the extensions designed for forming the turned-back portions 47 and 57 may increase the freedom in the shape of the second stage product W2 to be punched from the hoop material W1. Thus, the shape of punching (press-forming) from the hoop material W1 can be suitably changed according to the shape of the second stage product W2 that includes the extending portion or the extensions designed to be folded into the turned-back portions 47 and 57. In other words, the shape of the second stage product W2 punched from the hoop material W1 for forming the sensor terminal member 41 and the motor terminal member 51 can be suitably changed by providing the turned-back portions 47 and 57. Therefore, it is possible to minimize the distance between a portion for forming the sensor terminal member 41 and a portion for forming the motor terminal member 51 in the second stage product W2 and to minimize the distance between the second stage products W2 that may be punched from the same hoop material W1. Hence, it is possible to minimize the amount of use of the material of the hoop material W1.

In addition, shapes of portions of the second stage product W2 prepared for forming into the sensor terminal member 41 and the motor terminal member 51 may be suitably determined to minimize the number of assembling steps that are necessary for manufacturing the rotational angel detection device 32, while it is possible to reduce the unusable portions of the hoop material W1. Therefore, it is possible to improve the efficiency in manufacturing the rotational angle detection device 32 and to reduce the manufacturing cost of the same.

Further, the connection terminals 43 are formed by folding-back the extending portion, which extends from the sensor terminal member 41 (more specifically, the sensor terminal 414), at the turned-back portions 47, so that the extending portion having the turned-back portions 47 extends substantially perpendicular to the sensor terminal 414 from which the extending portion extend. Therefore, the folding lines 461 for forming the turned-back portions 47 may extend substantially parallel to the wiring direction of the sensor terminal member 41 (i.e., the extending direction of the sensor terminal 414 and the other terminals 411, 412 and 413). With this arrangement, the turned-back portions 47 can be accurately formed by the folding operation.

In addition, the turned-back portions 47 are provided as parts of the terminal body section 42 of the sensor terminal member 41. Therefore, by suitably setting the positions of the turned-back portions 47, it is possible to minimize the distance between the wiring members (i.e., the connection terminals 43) of the terminal body section 42. Therefore, it is possible to cope with such a design that the connection terminal sections 39 of the magnetic detection elements 35 are spaced from each other by a small distance. Hence, it is possible to downsize the rotational angle detection device 32.

Further, with the rotational angle detection device 32, the turned-back portions 57 are provided as parts of the terminal body section 52 of the motor terminal member 51. Therefore, it is not necessary to form the motor connectors 301 separately from the terminal body section 52. Therefore, the terminal body section 52 and the motor connectors 301 can be formed at one time as a one-piece member. Hence, it is possible to reduce the assembling steps necessary for manufacturing the rotational angle detection device 32. Further, by appropriately setting the positions of the motor connectors 301, it is possible to reduce the unusable portion of the hoop material W1, which may not be used for forming the motor terminal member 51 including the motor connectors 301. In particular, it is possible to effectively use the remaining portion of the hoop material W1, which is not used for forming the motor terminal member 51, as a portion for forming the motor connectors 301. Therefore, it is possible to form the motor connectors 301 from the hoop material W1 together with the terminal body section 52 of the motor terminal member 51, while it is possible to reduce the amount of use of the hoop material W1.

Furthermore, because each of the turned-back portions 47 is formed to have the substantially elliptical ring-shaped part 471, a potential stress that may be applied to the turned-back portion 47 may not be concentrated but may be dispersed along the direction of ring-shape. Therefore, it is possible to prevent potential breakage of the turned-back portions 47, which may be caused due to concentration of a stress.

The present invention may not be limited to the above embodiment but may be modified in various ways.

For example, the magnetic detection element 35 may be replaced with any other type of magnetic detection element, such as that having a sensing section incorporating a magneto-electric converting IC. Further, the number of terminals of the sensor terminal member may not be limited to four, and the number of terminals of the motor terminal member may not be limited to two. Thus, the number of terminals of the sensor terminal member and the number of terminals of the motor terminal member may be suitable determined.

In addition, although the connecting structures 48 for connecting between the terminal body section 42 and the connector section 45, and the connecting structures 58 for connecting between the terminal body section 52 and the connector section 55 are configured as crimping structures, the connecting structures 48 and 58 may be replaced with any other structures that can connect between the terminal body section 42 and the connector section 45 and between the terminal body section 52 and the connector section 55. For example, the terminal body section 42(52) and the connector section 45(55) may be connected to each other by laser welding.

What is claimed is:

1. A rotational angle detection device for use with a throttle valve device including a valve and a motor for rotating the valve comprising:
    a magnetic detection element configured to magnetically detect a rotational angle of the valve;
    a sensor wiring member configured to be connected to the magnetic detection element and to transmit a detection signal outputted from the magnetic detection element; and
    a motor wiring member configured to be connected to the motor, so that an electric power is supplied to the motor via the motor wiring member; wherein:
    each of the sensor wiring member and the motor wiring member includes a terminal body section and a connector section formed separately from each other, the terminal body section and the connector section of the sensor wiring member being configured to be connected to the magnetic detection element and an external connector, respectively, and the terminal body section and the connector section of the motor wiring member being configured to be connected to the motor and an external connector, respectively;
    the terminal body section and the connector section of the sensor wiring member are electrically connected to each other via a first connection structure;
    the terminal body section and the connector section of the motor wiring member are electrically connected to each other via a second connection structure; and
    a material of the terminal body section and a material of the connector section of each of the sensor wiring member and the motor wiring member are different from each other.

2. The rotational angle detection device according to claim 1, wherein a thickness of the terminal body section and a thickness of the connector section of each of the sensor wiring member and the motor wiring member are different from each other.

3. The rotational angle detection device according to claim 1, wherein each of the first and second connection structures is a crimping structure.

4. The rotational angle detection device according to claim 1, further comprising an electrical insulation member molded by resin and covering the first and second connection structures, so that the connection structures are arranged in series and bundled together by the electrical insulation member.

5. The rotational angle detection device according to claim 1, wherein at least one of the sensor wiring member and the motor wiring member includes a wiring portion with a turned-back portion turned back to be overlapped with the wiring portion.

6. The rotational angle detection device according to claim 5, wherein the wiring portion having the turned-back portion extends in a direction substantially perpendicular to an extending direction of the at least one of the sensor wiring member and the motor wiring member.

7. The rotational angle detection device according to claim 5, wherein the sensor wiring member includes the wiring portion with the turned-back portion.

8. The rotational angle detection device according to claim 5, wherein the motor wiring member includes the wiring portion with the turned-back portion.

9. The rotational angle detection device according to claim 5, wherein the turned-back portion includes a substantially annular part.

10. A throttle valve device comprising the rotational angle detection device according to claim 1.

11. A rotational angle detection device for use with a throttle valve device including a valve and a motor for rotating the valve comprising:
    a magnetic detection element configured to magnetically detect a rotational angle of the valve;
    a sensor wiring member configured to be connected to the magnetic detection element and configured to transmit a detection signal outputted from the magnetic detection element;
    a motor wiring member configured to be connected to the motor, so that an electric power is supplied to the motor via the motor wiring member; wherein:
    the sensor wiring member includes a first wiring portion with a first turned-back portion turned back to be overlapped with the first wiring portion.

12. The rotational angle detection device according to claim 11, wherein the wiring portion having the turned-back portion extends in a direction substantially perpendicular to an extending direction of the at least one of the sensor wiring member and the motor wiring member.

13. The rotational angle detection device according to claim 11, wherein the motor wiring member includes a second wiring portion with a second turned-back portion turned back to be overlapped with the second wiring portion.

14. The rotational angle detection device according to claim 11, wherein the turned-back portion includes a substantially annular part.

15. A rotational angle detection device for use with a throttle valve device including a valve and a motor for rotating the valve, comprising:
    a magnetic detection element configured to magnetically detect a rotational angle of the valve;
    a sensor wiring member configured to be connected to the magnetic detection element and to transmit a detection signal outputted from the magnetic detection element; and
    a motor wiring member configured to be connected to the motor, so that an electric power is supplied to the motor via the motor wiring member; wherein:
    each of the sensor wiring member and the motor wiring member includes a terminal body section and a connector section formed separately from each other, the terminal body section and the connector section of the sensor wiring member being configured to be connected to the magnetic detection element and an external connector, respectively, and the terminal body section and the connector section of the motor wiring member being configured to be connected to the motor and an external connector, respectively;
    the terminal body section and the connector section of the sensor wiring member are electrically connected to each other via a first connection structure;
    the terminal body section and the connector section of the motor wiring member are electrically connected to each other via a second connection structure; and
    each of the first and second connection structures is a crimping structure.

16. A rotation angle detection device for use with a valve device including a valve and a motor for rotating the valve, the rotation angle device comprising:
    a rotation angle sensor configured to detect a rotational angle of the valve;
    a sensor wiring member configured to be connected to the rotation angle sensor and to transmit a detection signal outputted from the rotation angle sensor; and
    a motor wiring member configured to be connected to the motor, so that an electric power is supplied to the motor via the motor wiring member,
    wherein the motor wiring member includes a terminal body section and a connector section formed separately from each other, the terminal body section and the connector section being configured to be connected to the motor and an external connector, respectively,
    wherein terminal body section and the connector section are connected to each other via a crimping structure, and
    wherein a material of the terminal body section and a material of the connector section are different from each other.

* * * * *